(12) United States Patent
Takahashi et al.

(10) Patent No.: US 11,180,677 B2
(45) Date of Patent: Nov. 23, 2021

(54) POLISHING AGENT FOR SYNTHETIC QUARTZ GLASS SUBSTRATE AND METHOD FOR POLISHING SYNTHETIC QUARTZ GLASS SUBSTRATE

(71) Applicant: SHIN-ETSU CHEMICAL CO., LTD., Tokyo (JP)

(72) Inventors: Mitsuhito Takahashi, Annaka (JP); Yoshihiro Nojima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 529 days.

(21) Appl. No.: 16/090,680

(22) PCT Filed: Feb. 23, 2017

(86) PCT No.: PCT/JP2017/006833
§ 371 (c)(1),
(2) Date: Oct. 2, 2018

(87) PCT Pub. No.: WO2017/183290
PCT Pub. Date: Oct. 26, 2017

(65) Prior Publication Data
US 2019/0119524 A1  Apr. 25, 2019

(30) Foreign Application Priority Data

Apr. 20, 2016  (JP) ............................ JP2016-84335

(51) Int. Cl.
*C09G 1/02* (2006.01)
*C03C 15/02* (2006.01)
(Continued)

(52) U.S. Cl.
CPC ............... *C09G 1/02* (2013.01); *B24B 37/00* (2013.01); *B24B 37/044* (2013.01); *C03C 15/00* (2013.01);
(Continued)

(58) Field of Classification Search
None
See application file for complete search history.

(56) References Cited

U.S. PATENT DOCUMENTS 4,786,325 A    11/1988  Melard et al.
5,567,403 A *  10/1996  Kimura .................. C01B 25/37
                                                 252/301.4 P
(Continued)

FOREIGN PATENT DOCUMENTS

CN    101555387 A    10/2009
CN    105038604 A    11/2015
(Continued)

OTHER PUBLICATIONS

Apr. 4, 2017 Search Report issued in Japanese Application No. PCT/JP2017/006833.
(Continued)

*Primary Examiner* — Shamim Ahmed
(74) *Attorney, Agent, or Firm* — Oliff PLC

(57) ABSTRACT

A polishing agent for a synthetic quartz glass substrate, containing polishing particles and water includes ceria particles as base particles, and composite oxide particles of cerium and at least one rare earth element selected from trivalent rare earth elements other than cerium are supported on surfaces of the base particles. This provides a polishing agent for a synthetic quartz glass substrate, the polishing agent having high polishing rate and being capable of sufficiently reducing generation of defects due to polishing.

7 Claims, 2 Drawing Sheets

(51) Int. Cl.
*C09K 3/14* (2006.01)
*B24B 37/00* (2012.01)
*C03C 19/00* (2006.01)
*B24B 37/04* (2012.01)
*C03C 15/00* (2006.01)

(52) U.S. Cl.
CPC ............ *C03C 19/00* (2013.01); *C09K 3/1436* (2013.01); *C09K 3/1445* (2013.01)

(56) References Cited

U.S. PATENT DOCUMENTS

| | | | | |
|---|---|---|---|---|
| 9,868,885 | B2* | 1/2018 | Mizoguchi | C09G 1/02 |
| 10,717,909 | B2* | 7/2020 | Masuda | C01F 17/00 |
| 2005/0026441 | A1 | 2/2005 | Takayasu | |
| 2008/0311487 | A1 | 12/2008 | Ito et al. | |
| 2013/0305618 | A1 | 11/2013 | Maezawa et al. | |
| 2016/0200944 | A1* | 7/2016 | Zhou | H01L 21/31053 |
| | | | | 438/693 |
| 2016/0358790 | A1* | 12/2016 | Shi | H01L 21/67092 |
| 2017/0152421 | A1* | 6/2017 | Ohtake | B01J 37/031 |

FOREIGN PATENT DOCUMENTS

| | | |
|---|---|---|
| JP | S63-027389 B2 | 6/1988 |
| JP | 2004-079968 A | 3/2004 |
| JP | 2004-98278 A | 4/2004 |
| JP | 2006-167817 A | 6/2006 |
| JP | 2007-213020 A | 8/2007 |
| WO | 2010/038503 A1 | 4/2010 |
| WO | 2012/101871 A1 | 8/2012 |

OTHER PUBLICATIONS

Apr. 13, 2020 Office Action issued in Taiwanese Patent Application No. 106113116.
Mar. 3, 2020 Office Action and Search Report issued in Chinese Patent Application No. 201780024422.4.
Sep. 16, 2020 Office Action and Search Report issued in Chinese Patent Application No. 201780024422.4.

* cited by examiner

POLISHING AGENT FOR SYNTHETIC QUARTZ GLASS SUBSTRATE AND METHOD FOR POLISHING SYNTHETIC QUARTZ GLASS SUBSTRATE

TECHNICAL FIELD

The present invention relates to a polishing agent for a synthetic quartz glass substrate, and a method for polishing a synthetic quartz glass substrate.

BACKGROUND ART

In recent years, along with pattern miniaturization by photolithography, synthetic quartz glass substrates are required to have more stringent qualities such as defect density, defect size, surface roughness, and flatness. Above all, regarding defects on the substrates, higher quality is required as integrated circuits become finer and magnetic media have higher capacity.

In view of this, a polishing agent for a synthetic quartz glass substrate is strongly required that the quartz glass substrate after polishing should have small surface roughness, and that the quartz glass substrate should have few surface defects such as a scratch on the polished surface, so as to improve the quality of the quartz glass substrate after polishing. Moreover, in view of productivity improvement, it is also required to increase the polishing rate of the quartz glass substrate.

Conventionally, in general, a silica-based polishing agent has been studied as a polishing agent for polishing a synthetic quartz glass. Silica-based slurry is produced by subjecting silica particles to grain growth through thermal decomposition of silicon tetrachloride and adjusting pH with an alkaline solution of ammonia or the like, which contains no alkali metal. For example, Patent Document 1 describes that defects can be reduced by using high-purity colloidal silica around neutrality. However, considering the isoelectric point of colloidal silica, colloidal silica is unstable around neutrality, and there is concern that the particle size distribution of colloidal silica abrasive grains varies during polishing, thereby bringing about a problem that the colloidal silica cannot be stably used. In addition, it is difficult to circulate and repeatedly use the polishing agent, which thus has to be disposed after one-time use, resulting in an economically unfavorable problem. Moreover, Patent Document 2 describes that defects can be reduced by using a polishing agent containing an acid and colloidal silica having an average primary particle diameter of 60 nm or less. However, this polishing agent is insufficient to satisfy current requirements, and further development is required.

Meanwhile, ceria ($CeO_2$) particles, which have lower hardness than silica particles and alumina particles, hardly cause defects such as a scratch on the surface of the synthetic quartz glass substrate after polishing. Therefore, a polishing agent using ceria particles as polishing abrasive grains is effective in reducing defects. In addition, ceria particles are known as a strong oxidizing agent and have chemically active characteristics.

Typically, the ceria-based polishing agent uses dry ceria particles. The dry ceria particles have irregular crystal shapes, and the application to a polishing agent results in a problem that defects such as a scratch are easily generated on the surface of the quartz glass substrate. On the other hand, wet ceria particles have a polyhedral structure and can greatly improve defects such as a scratch, compared with dry ceria particles. Thus, wet ceria particles are useful.

Further, it is believed that the redox between Ce(IV) and Ce(III) of ceria is effective in improving the polishing rate of an inorganic insulator such as glass. Introducing oxygen defect by substituting part of tetravalent ceria with a different trivalent metal element presumably can increase the reactivity with an inorganic insulator such as glass.

CITATION LIST

Patent Documents

Patent Document 1: Japanese Unexamined Patent Publication (Kokai) No. 2004-98278
Patent Document 2: Japanese Unexamined Patent Publication (Kokai) No. 2007-213020
Patent Document 3: Japanese Unexamined Patent Publication (Kokai) No. 2006-167817
Patent Document 4: Japanese Examined Patent Publication (Koukoku) No. Sho 63-27389

SUMMARY OF INVENTION

Technical Problems

When wet ceria particles are solely used as a polishing agent for a synthetic quartz glass substrate, defects such as a scratch are reduced, but the polishing rate cannot meet the current requirement of the polishing rate. Patent Document 3 describes that the polishing rate can be accelerated by using a polishing agent which uses colloidal silica, and which contains a polymer having a sulfonic acid group, such as an acrylic acid/sulfonic acid copolymer. However, the addition of such a polymer to a ceria-based polishing agent is still insufficient to achieve the currently required polishing rate, and further improvement of the polishing rate is required.

Furthermore, Patent Document 4 describes that the polishing rate can be accelerated by using a polishing agent containing 0.5 to 60% by mass of at least one rare earth element selected from the group consisting of cerium, lanthanide, and yttrium. However, the oxide particles obtained in Patent Document 4 have an average particle diameter of 0.5 to 1.7 µm. This particle size is so large that the synthetic quartz glass substrate after polishing has a problem in surface accuracy.

As has been described above, the conventional techniques have problems that it is difficult to achieve both the reduction in polishing defects and the sufficient improvement in polishing rate.

The present invention has been accomplished in view of the problems as described above. An object of the present invention is to provide a polishing agent for a synthetic quartz glass substrate, the polishing agent having high polishing rate and being capable of sufficiently reducing generation of defects due to polishing. Another object of the present invention is to provide a method for polishing a synthetic quartz glass substrate with high polishing rate while sufficiently reducing generation of defects.

Solution To Problems

To achieve the above object, the present invention provides a polishing agent for a synthetic quartz glass substrate, comprising polishing particles and water, wherein
the polishing particles comprise ceria particles as base particles, and composite oxide particles of cerium and at least one rare earth element selected from trivalent rare earth elements other than cerium are supported on surfaces of the base particles.

The polishing agent for a synthetic quartz glass substrate contains such polishing particles as described above, and enables high polishing rate while sufficiently inhibiting generation of defects such as a scratch in comparison with a case of using the ceria particles alone. As the composite oxide particles supported on the ceria particle surfaces are formed from a composite oxide of tetravalent ceria and a trivalent rare earth element other than cerium, oxygen defect is introduced to the supported composite oxide particles. As a result, the valence of the ceria in the composite oxide particles is likely to change. This improves the activity and the reactivity with the surface of a synthetic quartz glass substrate. Thus, the polishing rate is improved. In addition, supporting the composite oxide particles on the ceria particle surfaces decreases sharp crystal planes of the polyhedral crystal structure of, for example, wet ceria particles or the like, making it possible to inhibit defect generation onto a synthetic quartz glass substrate due to polishing. Note that, in the following description, the "base particles" may be referred to as "ceria base particles," and the "composite oxide particles of cerium and at least one rare earth element selected from trivalent rare earth elements other than cerium" may be referred to as "ceria composite oxide particles."

Here, preferably, the base particles comprise wet ceria particles, and the wet ceria particles have an average primary particle size of 40 nm or more to 100 nm or less.

Since wet ceria has a polyhedral crystal structure, a scratch is hardly made originally in comparison with dry ceria. Further, in the present invention, the composite oxide particles decrease sharp crystal planes of the polyhedral crystal structure, thereby enabling further scratch reduction. In addition, when the base particles made of the wet ceria particles have an average primary particle size of 40 nm or more, the polishing rate for a synthetic quartz glass substrate can be improved. Moreover, when the average primary particle size is 100 nm or less, polishing damage such as a scratch can be especially inhibited.

Preferably, the composite oxide particles are a composite oxide of cerium and lanthanum, and a molar ratio of cerium/lanthanum is 1.0 to 4.0.

When the molar ratio of cerium/lanthanum in the composite oxide particles is within the range of 1.0 to 4.0, the reactivity between the composite oxide particles and the surface of a synthetic quartz glass substrate is further improved, and the polishing rate is more improved.

Additionally, the composite oxide particles preferably have particle diameters of 1 nm or more to 50 nm or less.

When the particle diameters of the composite oxide particles are as large as 1 nm or more, the polishing rate for a synthetic quartz glass substrate can be sufficiently ensured. Moreover, when the particle diameters are 50 nm or less, the number of the composite oxide particles that can be supported on the base particles is increased, and the polishing rate for a synthetic quartz glass substrate is further improved.

In addition, a concentration of the polishing particles is preferably 5 parts by mass or more to 20 parts by mass or less per 100 parts by mass of the polishing agent for a synthetic quartz glass substrate.

When the concentration of the polishing particles is 5 parts by mass or more per 100 parts by mass of the polishing agent for a synthetic quartz glass substrate, favorable polishing rate is achieved. Moreover, when the concentration is 20 parts by mass or less, the storage stability of the polishing agent can be more increased.

Preferably, the polishing agent for a synthetic quartz glass substrate of the present invention further comprises an additive, wherein a concentration of the additive is 0.1 parts by mass or more to 5 parts by mass or less per 100 parts by mass of the polishing particles.

When the polishing agent for a synthetic quartz glass substrate contains an additive, the polishing particles easily disperse in the polishing agent and do not easily generate secondary particles having large particle diameters, so that polishing damage can be further inhibited. Moreover, when the concentration of the additive is 0.1 parts by mass or more per 100 parts by mass of the polishing particles, the polishing particles more stably disperse in the polishing agent and do not easily form aggregated particles having large particle diameters. When the concentration is 5 parts by mass or less, the additive does not impede polishing, and can prevent a reduction in the polishing rate.

Further, the polishing agent for a synthetic quartz glass substrate of the present invention preferably has a pH of 3.0 or more to 8.0 or less.

When the pH is 3.0 or more, the polishing particles more stably disperse in the polishing agent. When the pH is 8.0 or less, the polishing rate can be further improved.

Furthermore, the present invention provides a method for polishing a synthetic quartz glass substrate, comprising a rough polishing step and a finish polishing step after the rough polishing step, wherein the above-described polishing agent for a synthetic quartz glass substrate of the present invention is used in the finish polishing step for finish polishing.

Such a polishing method using the polishing agent for a synthetic quartz glass substrate of the present invention enables high polishing rate and can inhibit generation of defects due to polishing.

Advantageous Effects of Invention

The polishing agent for a synthetic quartz glass substrate of the present invention and the polishing method using the same enable sufficient polishing rate and sufficient inhibition of defect generation on the surface of a synthetic quartz glass substrate in polishing the synthetic quartz glass substrate. As a result, productivity and yield can be improved to produce synthetic quartz glass substrates. In addition, especially when the polishing agent for a synthetic quartz glass substrate of the present invention is used in a finish polishing step in a process for producing a synthetic quartz glass substrate, finer semiconductor devices can be obtained.

DESCRIPTION OF EMBODIMENTS

Figure 1:
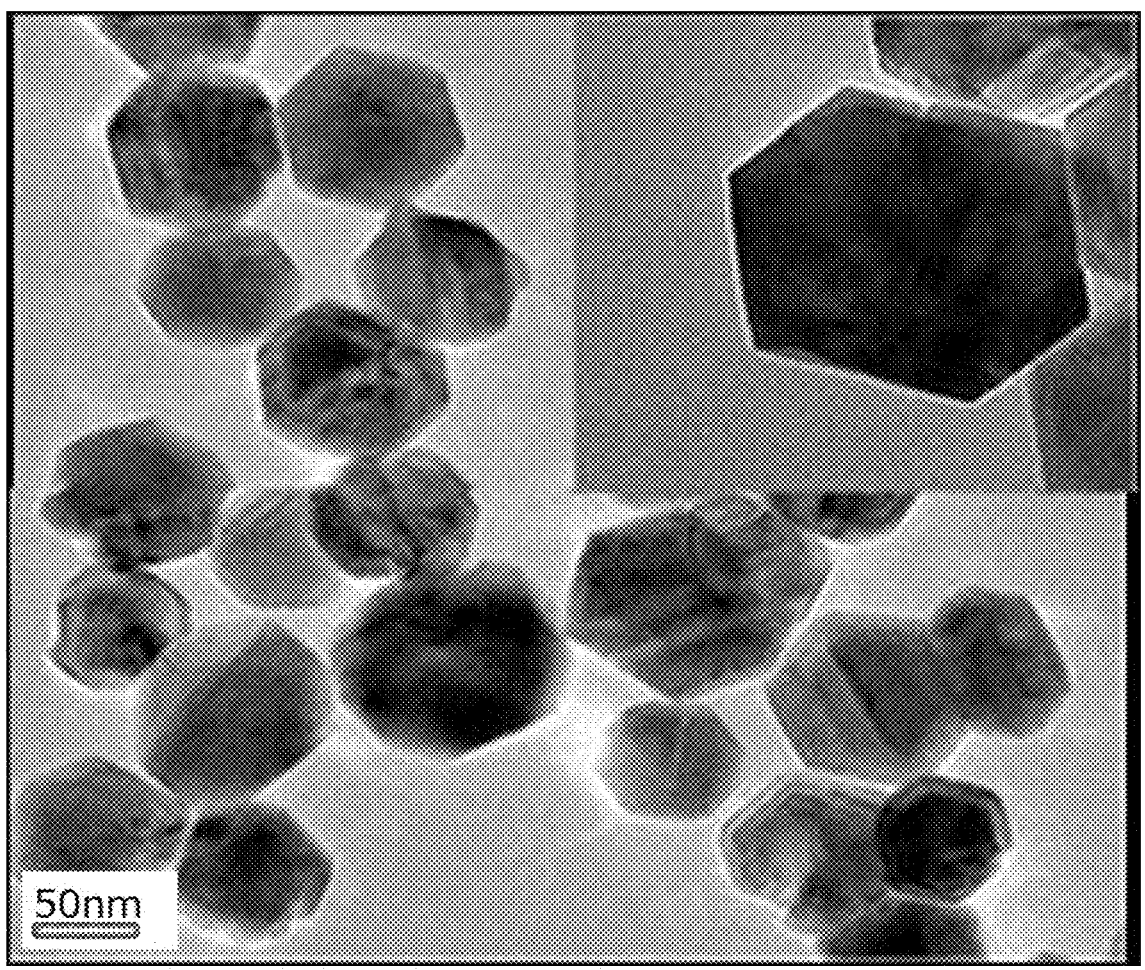
FIG. 1 is a photograph of wet ceria particles generated by a wet chemical precipitation method.

Hereinafter, embodiments of the present invention will be described, but the present invention is not limited thereto.

As described above, in the polishing agent for a synthetic quartz glass substrate (hereinafter, also simply referred to as "polishing agent") of the present invention, the polishing particles contain ceria particles as the base particles, and composite oxide particles of cerium and at least one rare earth element selected from trivalent rare earth elements other than cerium are supported on the surfaces of the ceria base particles.

In the polishing agent for a synthetic quartz glass substrate of the present invention, such ceria particles carrying the ceria composite oxide particles on the surfaces are used as the polishing particles. This inhibits generation of defects such as a scratch due to polishing, and enables polishing at high polishing rate.

The supported ceria composite oxide particles have oxygen defect in the crystal structure, unlike the ceria particles serving as the base. Hence, in comparison with ceria particles having a stable single crystal structure, the ceria composite oxide particles have highly active surfaces. Thus, in the polishing process, a chemical reaction readily occurs between the ceria composite oxide particles and the surface of a synthetic quartz glass substrate. As a result, the surface of the synthetic quartz glass is modified, which presumably promotes the polishing.

Hereinafter, detailed explanation is given for the components, components that can be optionally added, and polishing a synthetic quartz glass substrate with the polishing agent of the present invention.

As mentioned above, the polishing agent of the present invention contains the polishing particles in which ceria particles serves as the base particles, and composite oxide particles of cerium and at least one rare earth element selected from trivalent rare earth elements other than cerium are supported on the surfaces of the base particles.

In the present invention, the base particles are preferably wet ceria particles. The wet ceria particles can be produced by a wet chemical precipitation method in which a cerium salt used as the precursor substance is mixed with a basic solution and subjected to a heat treatment. Since the crystal structure of the wet ceria particles is a polyhedral crystal structure, generation of polishing damage such as a scratch can be reduced, compared with the use of dry ceria particles having irregular crystal structure.

When the base particles of the present invention are wet ceria particles, it is preferable to use the base particles having an average particle diameter ranging from 5 nm or more to 200 nm or less, more preferably 20 nm or more to 150 nm or less. It is further preferable to use the base particles having an average particle diameter ranging from 40 nm or more to 100 nm or less. In this event, when the base particles made of the wet ceria particles have an average particle diameter of 5 nm or more, the polishing rate for a synthetic quartz glass substrate is improved. When the average particle diameter is 200 nm or less, polishing damage such as a scratch can be further reduced.

Moreover, the ceria composite oxide particles supported on the base particles are a composite oxide of cerium and a trivalent rare earth element other than cerium. The trivalent rare earth element other than cerium includes yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Tb), lutetium (Lu), and the like. Among these, lanthanum is suitably usable and the raw material is readily available.

The amount of the trivalent rare earth element contained in the ceria composite oxide particles is preferably 10 mol % to 60 mol %, more preferably 20 mol % to 50 mol %. When the content of the trivalent rare earth element is 10 mol % or more, the effect of improving the polishing rate for a synthetic quartz glass substrate is more increased. When the content is 60 mol %, the polishing rate for a quartz glass substrate is further improved.

The composite oxide particles are particularly preferably a composite oxide of cerium and lanthanum, and the molar ratio of cerium/lanthanum is preferably 1.0 to 4.0. When the molar ratio of cerium/lanthanum in the composite oxide particles is within the range of 1.0 to 4.0, the reactivity between the composite oxide particles and the surface of a synthetic quartz glass substrate is further improved, and the polishing rate is more improved.

The composite oxide particles supported on the base particles preferably have particle diameters ranging from 1 nm or more to 50 nm or less, more preferably ranging from 3 nm or more to 30 nm or less, and further preferably ranging from 5 nm or more to 20 nm or less. When the particle diameters of the composite oxide particles are as large as 1 nm or more, the polishing rate for a synthetic quartz glass substrate can be sufficiently ensured. Moreover, when the particle diameters are 50 nm or less, the number of the composite oxide particles that can be supported on the base particles is increased, and the polishing rate for a synthetic quartz glass substrate is more improved.

The concentration of the polishing particles including the base particles and the composite oxide particles used in the present invention is not particularly limited, but is preferably 0.1 parts by mass or more, more preferably 1 part by mass or more, and further preferably 5 parts by mass or more, per 100 parts by mass of the polishing agent from the viewpoint that favorable polishing rate for a synthetic quartz glass substrate is achieved. Moreover, the upper limit concentration of the polishing particles is preferably 50 parts by mass or less, more preferably 30 parts by mass or less, and further preferably 20 parts by mass or less, from the viewpoint that the storage stability of the polishing agent can be more increased.

The method for producing the wet ceria base particles is not particularly limited, and the following method can be employed. First, a cerium salt, which is a precursor, is mixed with ultrapure water to produce a cerium aqueous solution. The cerium salt and ultrapure water can be mixed at a ratio of, for example, 2:1 to 4:1. Here, as the cerium salt, at least one of a Ce(III) salt and a Ce(IV) salt can be utilized. Specifically, at least one Ce(III) salt may be mixed with ultrapure water, or at least one Ce(IV) salt may be mixed with ultrapure water, or at least one Ce(III) salt and at least one Ce(IV) salt may be mixed with ultrapure water. As the Ce(III) salt, cerium chloride, cerium fluoride, cerium sulfate, cerium nitrate, cerium carbonate, cerium perchlorate, cerium bromide, cerium sulfide, cerium iodide, cerium oxalate, cerium acetate, and the like can be mixed. As the Ce(IV) salt, cerium sulfate, ammonium cerium nitrate, cerium hydroxide, and the like can be mixed. Among these, cerium nitrate is suitably used as the Ce(III) salt, and ammonium cerium nitrate is suitably used as the Ce(IV) salt, in terms of ease of use.

Further, an acidic solution may be mixed to stabilize the cerium aqueous solution produced by mixing with ultrapure water. Here, the acidic solution and the cerium solution can be mixed at a ratio of 1:1 to 1:100. The usable acid solution includes hydrogen peroxide, nitric acid, acetic acid, hydrochloric acid, sulfuric acid, and the like. The cerium solution mixed with the acid solution may be adjusted to have a pH of, for example, 0.01.

A basic solution is produced separately from the cerium solution. As the basic solution, ammonia, sodium hydroxide, potassium hydroxide, or the like can be utilized, and these are mixed with ultrapure water for dilution to an appropriate concentration before use. With respect to the dilution ratio, the basis substance can diluted with ultrapure water at a ratio of 1:1 to 1:100. The diluted basic solution may be adjusted to have a pH of, for example, 11 to 13.

Next, the diluted basic solution is transferred to a reaction vessel and stirred for, for example, 5 hours or less under an inert gas atmosphere such as nitrogen, argon, or helium. Then, the diluted basic solution is mixed with the cerium aqueous solution at a rate of, for example, 0.1 L/sec or more. Subsequently, a heat treatment is performed at a predetermined temperature. In this event, the heat treatment can be performed at a heat treatment temperature of 100° C. or lower, for example, 60° C. or higher to 100° C. or lower; the heat treatment time may be 2 hours or more, for example, 2 hours to 10 hours. Moreover, as the heating rate from normal temperature to the heat treatment temperature, the temperature may be increased at a rate of 0.2° C. to 1° C. per minute, preferably 0.5° C. per minute.

Next, the mixed solution having been subjected to the heat treatment is cooled to room temperature. Through such processes, a mixed solution is produced in which wet ceria particles having primary particle diameters of, for example, 100 nm or less are generated. FIG. 1 shows an example of the wet ceria particles thus generated. It can be seen from the photograph shown in FIG. 1 that the wet ceria particles generated by the wet chemical precipitation method have polyhedral crystal structures.

As described above, a mixed solution of the precursor aqueous solution of a cerium salt with the diluted basic solution is heated at a heat treatment temperature within an appropriate range by increasing the temperature at an appropriate heating rate. Thereby, the cerium salt in the mixed solution reacts during the heating process, and fine nuclei of ceria ($CeO_2$) are generated. Then, crystals grow around the fine nuclei, so that 5- to 100-nm crystal particles of wet ceria particles are produced.

Next, an example of the method for supporting ceria composite oxide particles onto the produced wet ceria base particles will be described below. Nevertheless, the method for supporting composite oxide particles is not limited thereto. First, while the inert gas atmosphere is being kept, the mixed solution containing the ceria base particles produced by the above-described method is further charged with a basic solution and then stirred. As the basic solution, ammonia water can be suitably used. Next, a solution prepared by mixing a cerium salt and a salt of a trivalent rare earth element with ultrapure water at a ratio of 2:1 to 4:1 is mixed with the mixed solution containing the base particles. Then, a heat treatment is performed for 24 hours or less by heating at a temperature of 100° C. or lower, for example 60° C. or higher to 100° C. or lower. Here, as the salt of the trivalent rare earth element, a nitrate is suitably used.

As the heating rate in this event, the temperature can be increased to the heat treatment temperature at a heating rate of at least 0.5° C./min. The mixed solution having been subjected to the heat treatment for, for example, 24 hours or less as described above is cooled. By such treatments, polishing particles can be formed in which multiple ceria composite oxide particles made of ceria and the other trivalent rare earth element are supported on the surfaces of the ceria base particles.

In addition, the binding force between the ceria base particles and the ceria composite oxide particles can be adjusted by the heat treatment time. Increasing the heat treatment time can strengthen the binding force between the ceria base particles and the ceria composite oxide particles, while shortening the heat treatment time can weaken the binding force between the ceria base particles and the ceria composite oxide particles. The heat treatment time is preferably 1 hour to 24 hours, more preferably 2 hours to 12 hours. When the heat treatment time is sufficiently long such as 1 hour or more, the binding force between the ceria base particles and the supported ceria composite oxide particles is strengthened, and the detachment of the ceria composite oxide particles from the ceria base particles can be prevented during the polishing process. Moreover, when the heat treatment time is 24 hours or less, the productivity can be improved.

Figure 2:
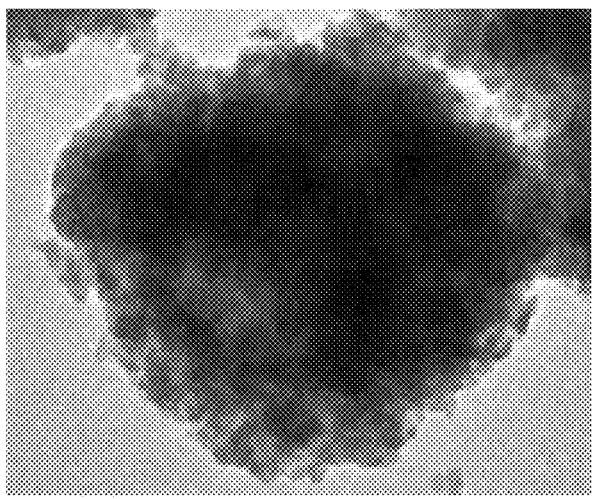
FIG. 2 is a photograph of a polishing particle of the present invention in which cerium-lanthanum composite oxide particles are supported on the surface of a base particle made of wet ceria.

Further, the particle diameters of the supported ceria composite oxide particles can be adjusted by the heat treatment temperature. The heat treatment is performed at a heat treatment temperature of preferably 60° C. to 100° C., more preferably 70° C. to 90° C. There is a trend that the higher the heat treatment temperature, the larger the particle diameters of the composite oxide particles, provided that the heat treatment time is the same. With the temperature of 60° C. or higher, the ceria composite oxide particles can surely grow to have desirable particle diameters necessary for desirable polishing. Besides, with the temperature of 60° C. or higher, increasing the temperature increases the particle diameters. Moreover, with the heat treatment temperature of 100° C. or lower, the particle diameters of the ceria composite oxide particles do not increase excessively, and the ceria composite oxide particles are surely supported on the ceria base particles. The polishing particles contained in the polishing agent of the present invention can be produced in the manner described above. FIG. 2 shows a photograph of the polishing particles including the ceria base particle supporting the ceria composite oxide particles on the surface. It can be observed that sharp crystal planes of the polyhedral crystal structure of the base particle are decreased by the composite oxide particles.

Furthermore, the polishing agent of the present invention may contain an additive to adjust the polishing characteristics. Such an additive includes amino acids and anionic surfactants that can change the surface potential of the polishing particles to negative. When the surface potential of the ceria particles is made negative, the particles easily disperse in the polishing agent and do not easily generate secondary particles having large particle diameters, so that generation of polishing damage can be further inhibited.

The anionic surfactants serving as the additive include monoalkyl sulfate, alkylpolyoxyethylene sulfate, alkylbenzene sulfonate, monoalkyl phosphate, lauryl sulfate, polycarboxylic acid, polyacrylate, polymethacrylate, and the like. Examples of the amino acids include arginine, lysine, aspartic acid, glutamic acid, asparagine, glutamine, histidine, proline, tyrosine, serine, tryptophan, threonine, glycine, alanine, methionine, cysteine, phenylalanine, leucine, valine, isoleucine, and the like.

When these additives are used, the concentration is preferably 0.001 parts by mass or more to 0.05 parts by mass or less per 1 part by mass of the polishing particles, that is, 0.1 parts by mass or more to 5 parts by mass or less per 100 parts by mass of the polishing particles. When the content is 0.1 parts by mass or more per 100 parts by mass of the polishing particles, the polishing particles more stably disperse in the polishing agent and do not easily form aggregated particles having large particle diameters. Moreover, when the content is 5 parts by mass or less per 100 parts by mass of the polishing particles, the additive does not impede polishing, and can prevent a reduction in the polishing rate. Therefore, the additive contained in the above range can further improve the dispersion stability of the polishing agent while preventing the reduction in the polishing rate.

The polishing agent of the present invention preferably has a pH ranging from 3.0 or more to 8.0 or less in view of excellent storage stability and polishing rate of the polishing agent. When the pH is 3.0 or more, the polishing particles more stably disperse in the polishing agent. When the pH is 8.0 or less, the polishing rate can be more improved. Moreover, the lower limit of preferable pH range is more preferably 4.0 or more, particularly preferably 6.0 or more. Meanwhile, the upper limit of preferable pH range is preferably 8.0 or less, more preferably 7.0 or less. The pH of the polishing agent can be adjusted by adding: an inorganic acid such as hydrochloric acid, nitric acid, sulfuric acid, or phosphoric acid; an organic acid such as formic acid, acetic acid, citric acid, or oxalic acid; ammonia, sodium hydroxide, potassium hydroxide, tetramethylammonium hydroxide (TMAH), or the like.

Next, the method for polishing a synthetic quartz glass substrate by using the polishing agent of the present invention will be explained. The polishing agent of the present invention is particularly preferably used in a finish polishing step after a rough polishing step. Accordingly, the explanation is given by taking, as an example, a case of performing single-side polishing in the finish polishing step. However, it is a matter of course that the present invention is not limited thereto, and the polishing agent of the present invention can also be used for rough polishing. Moreover, the polishing agent of the present invention can be used not only for single-side polishing, but also for double-side polishing or the like.

Figure 3:
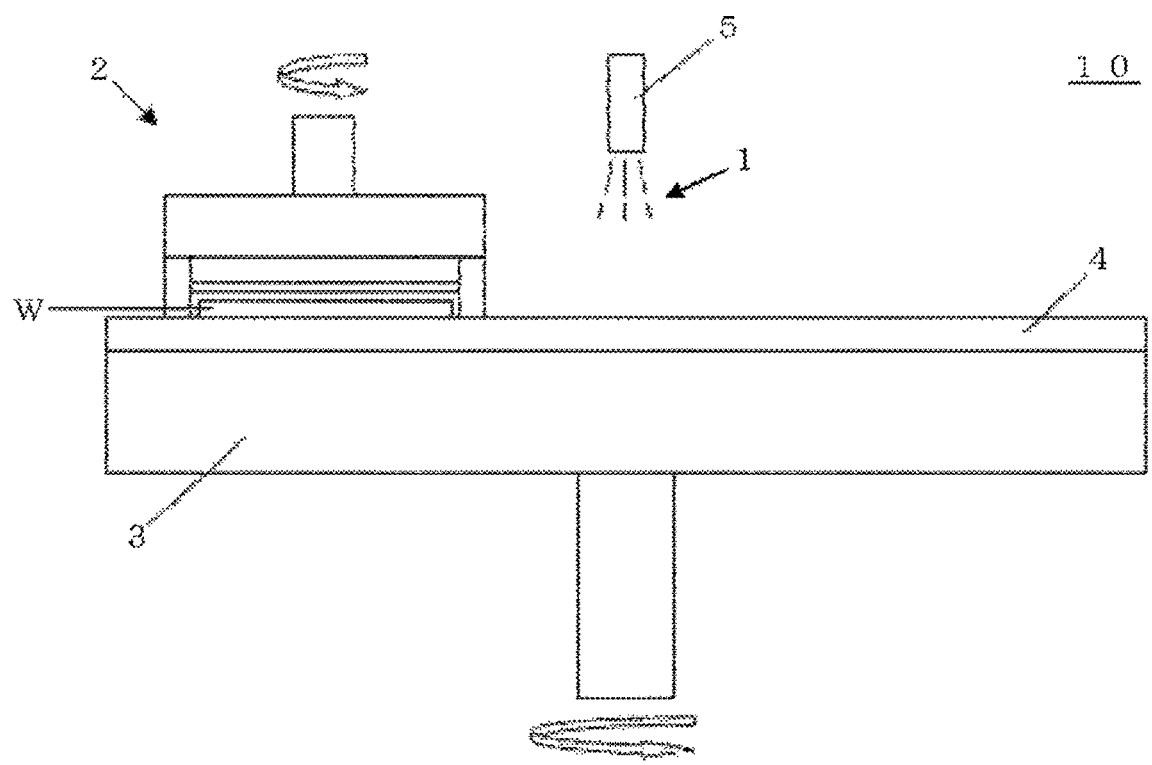
FIG. 3 is a schematic diagram showing an example of a polishing apparatus usable in a method for polishing a synthetic quartz glass substrate of the present invention.

A single-side polishing apparatus usable in the polishing method of the present invention can be, for example, a single-side polishing apparatus 10 that includes a turn table 3 to which a polishing pad 4 is attached, a polishing agent supply mechanism 5, a polishing head 2, and so forth as shown in FIG. 3. Moreover, as shown in FIG. 3, the polishing head 2 can rotate and hold a synthetic quartz glass substrate W to be polished. Further, the turn table 3 can also rotate. For the polishing pad 4, nonwoven fabric, foamed polyurethane, porous resins, or the like can be used. Further, since the surface of the polishing pad 4 is preferably always covered with a polishing agent 1 during polishing, the polishing agent supply mechanism 5 is preferably provided with a pump or the like to supply the polishing agent 1 successively. In the single-side polishing apparatus 10 as described above, the polishing head 2 holds the synthetic quartz glass substrate W, and the polishing agent supply mechanism 5 supplies the polishing agent 1 of the present invention onto the polishing pad 4. Then, the turn table 3 and the polishing head 2 are each rotated to bring the surface of the synthetic quartz glass substrate W into sliding contact with the polishing pad 4 for polishing. Such a polishing method using the polishing agent of the present invention can accelerate the polishing rate and inhibit generation of defects due to polishing. Moreover, the polishing method of the present invention can provide a synthetic quartz glass substrate having significantly fewer defects and thus is suitably utilizable for finish polishing.

Particularly, a synthetic quartz glass substrate subjected to finish polishing by the polishing method of the present invention can be used for semiconductor-related electronic materials, and can be suitably used for photomask, nanoimprinting, and magnetic devices. Note that a synthetic quartz glass substrate before finish polishing can be prepared, for example, by the following procedure. First, a synthetic quartz glass ingot is formed, and then the synthetic quartz glass ingot is annealed. Next, the synthetic quartz glass ingot is sliced into wafers. Subsequently, the sliced wafers are chamfered and then lapped. Thereafter, the surface of each wafer is polished to a mirror finish. After that, the synthetic quartz glass substrate thus prepared can be subjected to finish polishing by the polishing method of the present invention.

EXAMPLES

Hereinafter, the present invention will be more specifically described by showing Examples and Comparative Examples of the present invention, but the present invention is not limited to these Examples.

Example 1

(Synthesis of Wet Ceria Base Particles)

A solution in which 1000 g of cerium(III) nitrate hexahydrate ($Ce(NO_3)_3 \cdot 6H_2O$) had been dissolved in 250 g of pure water was mixed with 100 g of nitric acid to obtain a cerium(III) solution. Then, 1 g of diammonium cerium nitrate (($NH_4)_2Ce(NO_3)_3$) was dissolved in 500 g of pure water to obtain a cerium(IV) solution. Subsequently, the cerium(III) solution and the cerium(IV) solution were mixed to obtain a cerium mixed solution.

Under a nitrogen gas atmosphere, 4000 g of pure water was added dropwise into a reaction vessel. Then, 1000 g of ammonia water was added dropwise into the reaction vessel and stirred to obtain a basic solution.

Next, the cerium mixed solution was added dropwise into the reaction vessel, stirred, and heated to 80° C. under a nitrogen gas atmosphere. The heat treatment was thus performed for 8 hours, and a mixed solution containing wet ceria particles (base particles) was obtained.

Additionally, the average particle diameter of the wet ceria particles (base particles) finally obtained was adjusted by adjusting the mixing ratio of the cerium(III) solution and the cerium(IV) solution.

(Supporting Composite Oxide Particles onto Base Particles)

Into the mixed solution containing the ceria base particles, 1000 g of ammonia water was added dropwise to the reaction vessel and stirred.

Next, 1000 g of cerium nitrate hexahydrate, 1 g of diammonium cerium nitrate, and 300 g of lanthanum nitrate hexahydrate were dissolved in pure water such that the molar ratio of cerium and lanthanum was 80/20=4.0. Thus, a mixed solution of cerium and lanthanum was obtained.

Subsequently, the mixed solution of cerium and lanthanum was added dropwise into the reaction vessel, stirred, and heated to 80° C. under a nitrogen gas atmosphere. The heat treatment was thus performed for 8 hours, and a mixed solution containing the wet ceria particles supporting cerium-lanthanum composite oxide particles on the surfaces was obtained.

After the mixed solution containing the wet ceria particles supporting the cerium-lanthanum composite oxide particles on the surfaces was cooled to room temperature, the wet ceria particles in the mixed solution were precipitated. Then, cleaning with pure water and centrifugation were repeated several times to finally obtain polishing particles including the wet ceria particles supporting the cerium-lanthanum composite oxide particles on the surfaces. Additionally, the average particle diameter of the cerium-lanthanum composite oxide particles finally obtained was adjusted by adjusting the heating temperature.

(Preparation of Polishing Agent for Synthetic Quartz Glass Substrate)

500 g of the polishing particles synthesized by the above-described method, in which the composite oxide particles whose content ratio (molar ratio) of cerium/lanthanum was 80/20 (mol %)=4.0 were supported on the surfaces, were mixed with 5 g of sodium polyacrylate (manufactured by Wako Pure Chemical Industries, Ltd.) and 5000 g of pure water, and ultrasonically dispersed for 60 minutes under stirring. Then, the resulting slurry was filtered through a 0.5-micron filter to prepare a polishing agent for polishing a synthetic quartz glass substrate, the polishing agent containing 0.1 mass % sodium polyacrylate and the polishing particles at a concentration of 10 mass %. The obtained polishing agent had a pH of 6.5. According to the measurement under an electron microscope, the polishing particles had an average particle diameter of 70 nm, the base particles had an average particle diameter of 60 nm, and the composite oxide particles had an average particle diameter of 10 nm.

(Polishing Synthetic Quartz Glass Substrate)

A polishing pad (made of soft suede/manufactured by FILWEL Co., Ltd.) was attached to a turn table. A synthetic quartz glass substrate having a diameter of 4 inch (100 mm) after rough polishing was set to a substrate-mountable head. While the polishing agent for polishing a synthetic quartz glass substrate was being supplied in an amount of 100 ml per minute, the substrate was polished by 2 μm or more, which is an amount sufficient to remove the defect generated in the rough polishing step. In this event, the polishing load was 60 gf/cm$^2$, and the rotation speed of the turn table and the head was 50 rpm. After the polishing, the synthetic quartz glass substrate was taken from the head, washed with pure water, further subjected to ultrasonic cleaning, and then dried at 80° C. with a drier. The change in thickness of the synthetic quartz glass substrate before and after the polishing was measured with a reflection spectroscopic film thickness monitor (SF-3 manufactured by OTSUKA Electronics Co., Ltd.) to calculate the polishing rate. In addition, the number of defects of 100 nm or larger generated on the surface of the polished synthetic quartz glass substrate was counted with a laser microscope.

Example 2

A polishing agent was prepared by the same procedure as in Example 1, except that the content ratio (molar ratio) of cerium/lanthanum in the composite oxide particles was 50/50 (mol %)=1.0. The obtained polishing agent had a pH of 6.3. According to the electron microscope measurement, the polishing particles had an average particle diameter of 70 nm, the base particles had an average particle diameter of 60 nm, and the composite oxide particles had an average particle diameter of 10 nm.

Example 3

A polishing agent was prepared by the same procedure as in Example 1, except that the content ratio (molar ratio) of cerium/lanthanum in the supported composite oxide particles was 60/40 (mol %)=1.5. The obtained polishing agent had a pH of 6.3. According to the electron microscope measurement, the polishing particles had an average particle diameter of 70 nm, the base particles had an average particle diameter of 60 nm, and the composite oxide particles had an average particle diameter of 10 nm.

Example 4

A ceria polishing agent was prepared by the same procedure as in Example 1, except that in the treatment for supporting the composite oxide particles onto the wet ceria base particles, the heating temperature was set at 60° C. to decrease the particle diameters of the composite oxide particles. The obtained polishing agent had a pH of 6.8. According to the electron microscope measurement, the polishing particles had an average particle diameter of 61 nm, the base particles had an average particle diameter of 60 nm, and the composite oxide particles had an average particle diameter of 1 nm.

Example 5

A ceria polishing agent was prepared by the same procedure as in Example 1, except that in the treatment for supporting the composite oxide onto the wet ceria base particles, the heating temperature was set at 90° C. to increase the particle diameters of the composite oxide particles. The obtained polishing agent had a pH of 6.8. According to the electron microscope measurement, the polishing particles had an average particle diameter of 80 nm, the base particles had an average particle diameter of 60 nm, and the composite oxide particles had an average particle diameter of 20 nm.

Example 6

A polishing agent was prepared by the same procedure as in Example 1, except that the content ratio (molar ratio) of cerium/lanthanum in the composite oxide particles was 90/10 (mol %)=9.0. The obtained polishing agent had a pH of 6.5. According to the electron microscope measurement, the polishing particles had an average particle diameter of 70 nm, the base particles had an average particle diameter of 60 nm, and the composite oxide particles had an average particle diameter of 10 nm.

Comparative Example 1

A ceria polishing agent was prepared by the same procedure as in Example 1, except that the particles supported on the base particles had a composition of 100% ceria. The obtained polishing agent had a pH of 6.6. According to the electron microscope measurement, the polishing particles had an average particle diameter of 70 nm, the base particles had an average particle diameter of 60 nm, and the particles supported on the base particles had an average particle diameter of 10 nm.

Example 7

A polishing agent was prepared by the same procedure as in Example 1, except that the content ratio (molar ratio) of cerium/lanthanum in the composite oxide particles was 30/70 (mol %)=0.4. The obtained polishing agent had a pH of 6.5. According to the electron microscope measurement, the polishing particles had an average particle diameter of 70 nm, the base particles had an average particle diameter of 60 nm, and the composite oxide particles had an average particle diameter of 10 nm.

Comparative Example 2

A ceria polishing agent was prepared by the same procedure as in Example 1, except that the particles supported on the base particles had a composition of 100% lanthanum. The obtained polishing agent had a pH of 6.8. According to the electron microscope measurement, the polishing particles had an average particle diameter of 70 nm, the base particles had an average particle diameter of 60 nm, and the particles supported on the base particles had an average particle diameter of 10 nm.

Table 1 shows the physical properties of the polishing particles, the polishing rate, and the number of defects of 100 nm or larger present on the surface of the polished synthetic quartz glass substrate in Examples and Comparative Examples. Note that numerical values of the polishing rate and the number of defects in the table each represent an average value from five synthetic quartz glass substrates polished in corresponding Examples and Comparative Examples.

TABLE 1

|  | Content ratio (mol %) in supported composite oxide | | Average primary particle diameter (nm) of base particles | Average particle diameter (nm) of composite oxide particles | Polishing rate (μm/hr) | Defect (number) |
| --- | --- | --- | --- | --- | --- | --- |
|  | cerium | lanthanum |  |  |  |  |
| Example 1 | 80 | 20 | 60 | 10 | 2.5 | 4 |
| Example 2 | 50 | 50 | 60 | 10 | 3.0 | 4 |
| Example 3 | 60 | 40 | 60 | 10 | 2.8 | 4 |
| Example 4 | 80 | 20 | 60 | 1 | 2.0 | 3 |
| Example 5 | 80 | 20 | 60 | 20 | 2.9 | 5 |
| Example 6 | 90 | 10 | 60 | 10 | 1.9 | 4 |
| Comparative Example 1 | 100 | 0 | 60 | 10 | 1.2 | 3 |
| Example 7 | 30 | 70 | 60 | 10 | 1.7 | 4 |
| Comparative Example 2 | 0 | 100 | 60 | 10 | 0.6 | 4 |

When the synthetic quartz glass substrates were polished by using the polishing agents of Examples 1 to 7, that is, the polishing agent of the present invention supporting the composite oxide particles containing cerium and a trivalent rare earth element other than cerium on the base particles as polishing abrasive grains, generation of defects due to polishing was successfully inhibited. Furthermore, high polishing rates were obtained for the synthetic quartz glass substrate. On the other hand, even when particles were supported on the base particles as in Comparative Examples 1, 2, if the supported particles were not the composite oxide particles as those in the present invention, the polishing rate was lowered.

Moreover, in Examples 1 to 5 where the molar ratio of cerium and lanthanum in the supported composite oxide particles satisfied 1.0 to 4.0, the polishing rates for the synthetic quartz glass substrate were higher than those in Example 6 where the molar ratio was higher than 4.0 and Example 7 where the molar ratio was lower than 1.0.

As described above, when a synthetic quartz glass substrate is polished with the polishing agent for polishing a synthetic quartz glass substrate of the present invention, high polishing rate is achieved for the synthetic quartz glass substrate, and the synthetic quartz glass substrate can be polished with few defects generated on the polished surface.

It should be noted that the present invention is not restricted to the above-described embodiments. The embodiments are merely examples so that any embodiments that have substantially the same feature and demonstrate the same functions and effects as those in the technical concept as disclosed in claims of the present invention are included in the technical scope of the present invention.

The invention claimed is:

1. A polishing agent for a synthetic quartz glass substrate, comprising polishing particles and water, wherein
   the polishing particles comprise ceria particles as base particles, and
   composite oxide particles of cerium and at least one rare earth element selected from trivalent rare earth elements other than cerium are supported on surfaces of the base particles; wherein
   the base particles comprise wet ceria particles,
   the wet ceria particles have an average primary particle size of 40 nm or more to 100 nm or less, and
   the composite oxide particles have particle diameters of 1 nm or more to 50 nm or less.

2. The polishing agent for a synthetic quartz glass substrate according to claim 1, wherein
   the composite oxide particles are a composite oxide of cerium and lanthanum, and
   a molar ratio of cerium/lanthanum is 1.0 to 4.0.

3. The polishing agent for a synthetic quartz glass substrate according to claim 1, wherein a concentration of the polishing particles is 5 parts by mass or more to 20 parts by mass or less per 100 parts by mass of the polishing agent for a synthetic quartz glass substrate.

4. The polishing agent for a synthetic quartz glass substrate according to claim 2, wherein a concentration of the polishing particles is 5 parts by mass or more to 20 parts by mass or less per 100 parts by mass of the polishing agent for a synthetic quartz glass substrate.

5. The polishing agent for a synthetic quartz glass substrate according to claim 1, further comprising an additive, wherein
   a concentration of the additive is 0.1 parts by mass or more to 5 parts by mass or less per 100 parts by mass of the polishing particles.

6. The polishing agent for a synthetic quartz glass substrate according to claim 1, wherein the polishing agent has a pH of 3.0 or more to 8.0 or less.

7. A method for polishing a synthetic quartz glass substrate, comprising a rough polishing step and a finish polishing step after the rough polishing step, wherein
   a polishing agent is used in the finish polishing step for finish polishing, the polishing agent comprising polishing particles and water, wherein the polishing particles comprise ceria particles as base particles, and
composite oxide particles of cerium and at least one rare earth element selected from trivalent rare earth elements other than cerium are supported on surfaces of the base particles; wherein
the base particles comprise wet ceria particles,
the wet ceria particles have an average primary particle size of 40 nm or more to 100 nm or less, and
the composite oxide particles have particle diameters of 1 nm or more to 50 nm or less.

\* \* \* \* \*